United States Patent
Himmelsbach et al.

(10) Patent No.: US 8,221,194 B2
(45) Date of Patent: Jul. 17, 2012

(54) METHOD OF GRINDING BAR-SHAPED WORKPIECES, GRINDING MACHINE FOR CARRYING OUT THE METHOD, AND GRINDING CELL IN TWIN ARRANGEMENT

(75) Inventors: Georg Himmelsbach, Haslach (DE); Hubert Mueller, Nordrach (DE)

(73) Assignee: BSH Holice A.S, Holice (CZ)

( * ) Notice: Subject to any disclaimer, the term of this patent is extended or adjusted under 35 U.S.C. 154(b) by 1006 days.

(21) Appl. No.: 12/224,018

(22) PCT Filed: Feb. 12, 2007

(86) PCT No.: PCT/EP2007/001183
§ 371 (c)(1),
(2), (4) Date: Aug. 14, 2008

(87) PCT Pub. No.: WO2007/093345
PCT Pub. Date: Aug. 23, 2007

(65) Prior Publication Data
US 2010/0167628 A1    Jul. 1, 2010

(30) Foreign Application Priority Data
Feb. 15, 2006 (DE) .......................... 10 2006 007 055

(51) Int. Cl.
 B24B 1/00 (2006.01)
 B24B 7/17 (2006.01)
 B24B 19/08 (2006.01)
 G05B 19/18 (2006.01)

(52) U.S. Cl. ................ 451/10; 451/11; 451/49; 451/58; 451/65; 451/262; 451/282

(58) Field of Classification Search ................ 451/8, 10, 451/11, 49, 57, 58, 65, 66, 190, 194, 261, 451/262, 264, 265, 267, 268, 269, 403, 282
See application file for complete search history.

(56) References Cited

U.S. PATENT DOCUMENTS

| 3,859,756 | A  | * | 1/1975  | Zerbola ........................... 451/49 |
| 5,934,983 | A  | * | 8/1999  | Wada et al. ..................... 451/63 |
| 7,004,067 | B1 | * | 2/2006  | Godsey et al. .................. 101/35 |
| 7,607,969 | B2 | * | 10/2009 | Miura et al. .................... 451/11 |
| 7,674,157 | B2 | * | 3/2010  | Shirao ............................. 451/57 |
| 2011/0195635 | A1 | * | 8/2011 | Himmelsbach .................. 451/5 |

FOREIGN PATENT DOCUMENTS

| EP | 0 576 043 | 12/1993 |
| JP | 6 15553   | 1/1994  |
| PL | 161 480   | 6/1993  |

\* cited by examiner

*Primary Examiner* — Timothy V Eley
(74) *Attorney, Agent, or Firm* — Jordan and Hamburg LLP

(57) ABSTRACT

In order to grind bar-shaped workpieces which have a non-circular cross-section and flat faces which are parallel to each other, two partial operations are performed consecutively. First, the bar-shaped workpiece is rough ground and finished on the faces by way of double-disk face grinding. The bar-shaped workpiece is clamped on the longitudinal sides in the first clamping position thereof, and the bar-shaped workpiece is transported between two clamping jaws, which clamp the workpiece in the second clamping position thereof on the faces. The first clamping position is then released, and the bar-shaped workpiece is rotated by the clamping jaws. A CNC-controlled peripheral grinding step is performed based on CX interpolation principles. This rough grinds and finishes the longitudinal sides of the bar-shaped workpiece. Transport from the first to the second clamping position is effected by a clamping station, which concomitantly forms the holder for the face grinding operation.

21 Claims, 8 Drawing Sheets

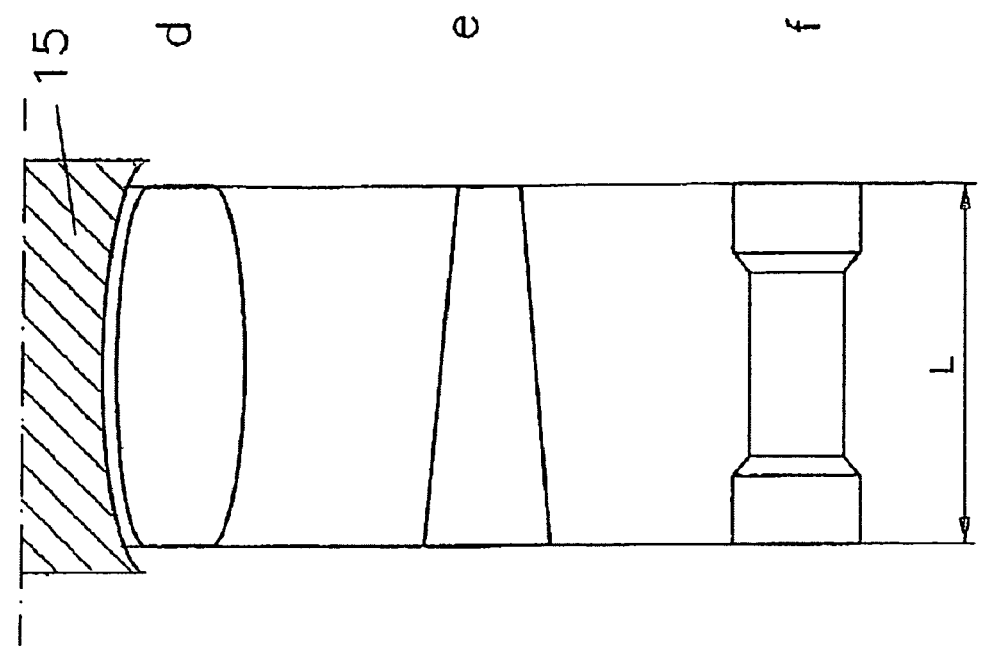
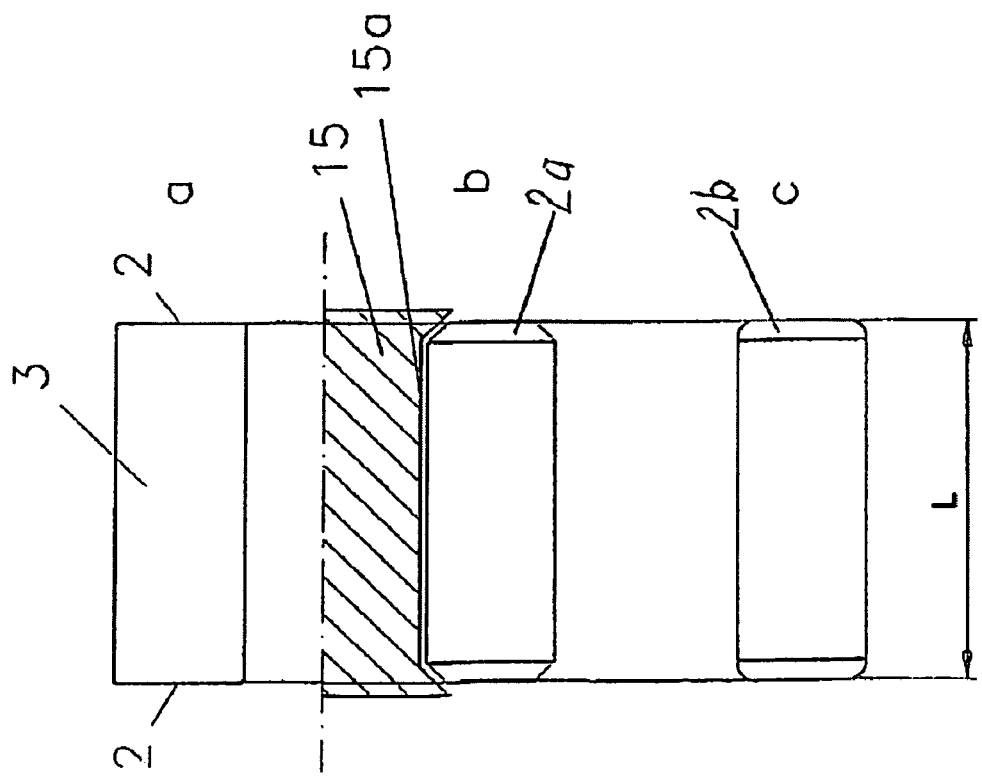
Fig. 2

METHOD OF GRINDING BAR-SHAPED WORKPIECES, GRINDING MACHINE FOR CARRYING OUT THE METHOD, AND GRINDING CELL IN TWIN ARRANGEMENT

BACKGROUND OF THE INVENTION

The invention relates to a method for grinding bar-shaped workpieces, which have a non-circular cross-section formed by flat and/or curved lines and flat faces extending parallel to each other.

A preferred field of application, which is mentioned, by way of example, for such bar-shaped workpieces, is mechanical adjusting, switching and control devices, in which bar-shaped parts function as actuators and transmit movements and forces. In this case, the bar-shaped workpieces can preferably have lengths between 20 and 80 mm, and a square cross-section preferably having an edge length between 4 and 15 mm. Various metals, as well as ceramics, are possible as materials. The non-circular cross-section means that, with appropriate guidance, the bar-shaped actuators are only displaced in the longitudinal directions thereof and, when mounted, do not twist.

In this application, very high demands are placed on the finished bar-shaped workpiece. In particular, the dimensional accuracy of the basic dimensions, the parallelity of the faces, exact compliance with right angles between the longitudinal sides and faces, the flatness of the faces, and a maximum roughness profile height Rz are noted.

The precision required in practical applications can presently only be achieved by machining each side of the bar-shaped workpiece individually by means of horizontal surface grinding. This method, however, is limited to geometric cross-sections with straight edges. With this grinding method, it is difficult to supply the grinding zone with cooling lubricant, due to the surface contact with the grinding wheel. For this reason, the time savings achieved is not as great as with peripheral grinding. Furthermore, the frequency with which the workpiece must be turned and rechucked prevents economical mass production.

For grinding the faces of pins and similar parts, the double-disk face grinding method is known, for example, using a machine made by the applicant with the model name Saturn H (Junker brochure, partner for precision, of Feb. 6, 2002, FIGS. 86 and 87). To this end, a rotating carrier disk, comprising axially extending bores in the circumferential region thereof, serves as the workpiece holder. The pins are located in the bores and protrude laterally beyond the lateral faces of the carrier disk. Two rotating grinding wheels, which are disposed coaxially at a distance from each other, are positioned on either side of the rotating carrier disk at the periphery thereof, the distance between the grinding wheels corresponding to the grinding dimensions for the pins. In this manner, face-grinding is simultaneously performed on the faces of many pins by the lateral surfaces of the grinding wheels.

This known method cannot easily be applied to the grinding of the bar-shaped workpieces mentioned above. Firstly, the blanks for these workpieces have different grinding allowances. As a result, mounting in simple recesses in a carrier disk is not possible, as non-circular cross-sections are assumed. An imprecise fit in the carrier disk would negatively impact the parallelity of the faces as well as the compliance with exact right angles between the faces and lateral surfaces. Furthermore, grinding in individual lots is not in keeping with the requirements of high-volume production, if not only the faces, but also the flat longitudinal sides, of the bar-shaped workpieces are to be ground in large numbers. There is also a need for configuring the non-circular cross-sections of the bar-shaped parts in a variable manner, so as to include curved lines. The bar-shaped workpiece may even require a longitudinal contour, deviating from the parallel course of two straight lines.

It is therefore the object of the invention to design a method of the type described above, so that economical mass production and excellent grinding results are achieved, and whereby various cross-sectional shapes and longitudinal contours can be ground for the bar-shaped workpieces.

SUMMARY OF THE INVENTION

This object is achieved by a method which includes clamping a bar-shaped workpiece on longitudinal sides thereof in a first clamping position, simultaneously finishing two end faces of the bar-shaped workpiece by employing double-disk face grinding, transferring the clamped bar-shaped workpiece between two clamping jaws coaxially disposed at a distance from each other and clamping at the end faces thereof by the clamping jaws in a second clamping position, releasing the first clamping position on the longitudinal sides, rotating the clamping jaws in a synchronously controlled manner, rough grinding the longitudinal sides of the bar-shaped workpiece and finishing by employing CNC-controlled peripheral grinding based on CX interpolation principles, wherein the C-axis is formed by a common rotational and drive axis of the two clamping jaws and the X-axis extends perpendicular to the C-axis, moving apart the clamping jaws in order to release the second clamping position, and transferring the bar-shaped workpiece to an unloading device.

The method according to the invention is used to perform the complete grinding process for the bar-shaped workpiece in two partial operations so that the entire machining operation can be performed with a single grinding machine in a continuous production process. To this end, two different clamping positions, or clampings, which merge seamlessly, occur consecutively. First, each workpiece is clamped individually on the longitudinal sides thereof, such that it is not merely inserted into the chamfered recess of a carrier disk, which forms the first clamping position. In this position, the finishing of the two faces is performed. In general, the faces are rough ground and finished in this clamping position. However, there is no necessity for separate rough grinding at this point. When the clamping device is suitably configured, the double-disk face grinding operation produces excellent results on the faces. The workpiece, which is still in the clamped state, i.e., in the first clamping position, is then transferred between two clamping jaws, which are coaxially disposed at a distance from each other, by means of this clamping device and is clamped by these jaws at the faces thereof, which have already been finished, and therefore offer excellent conditions for precise subsequent machining.

The clamping jaws bring about a second clamping position for the bar-shaped workpiece, the first clamping position now being released. As the two clamping jaws are now rotated synchronously and in-phase in a controlled manner, CNC-controlled peripheral grinding based on CX interpolation principles can be performed on the workpiece. Each rotational position of the workpiece, which is moved in rotation by the two clamping jaws (axis of rotation C) corresponds to a defined grinding wheel distance in the x-axis direction. Those skilled in the art of grinding technology are familiar with the details from CNC-controlled non-circular grinding and therefore no detailed description is required here.

If the bar-shaped workpiece is machined based on non-circular grinding principles, as differs from surface grinding, there is line contact between the grinding wheel and the workpiece. As a result, the supply of coolant is improved, and greater time saving is achieved, which considerably shortens machining time.

The CNC-controlled peripheral grinding method can be used for rough grinding and finishing bar-shaped workpieces having various cross-sections, i.e., from simple square or rectangular cross-sections having rounded longitudinal edges, or flat chamfers on the longitudinal edges, to prismatic cross-sections, or cross-sections delimited by different curvatures, and combinations of these shapes. Being able to simply grind flat longitudinal sides having chamfered or rounded edges in one operation, as well as cross-sections having consistently curved contours, avoids the problems of burr formation resulting from face grinding. Selected possibilities are summarized by illustration in FIG. 1 of the embodiment.

If peripheral grinding is performed with a chamfered grinding wheel extending over the entire length of the bar-shaped workpiece, the longitudinal contour of the workpiece can also be configured differently. Examples are summarized by illustration in FIG. 2 of the embodiment. These different longitudinal contours also include chamfers and rounded edges on the faces.

By moving the clamping jaws apart after finishing, the second clamping position is released and the finished bar-shaped workpiece is delivered to an unloading station.

A further approach in accordance with the invention provides advantageous details regarding the first partial operation, i.e., the double-disk face grinding of the faces. In general, both the bar-shaped workpiece located in the first clamping position and the two rotating first grinding wheels are displaceable in the direction of the X-axis. The clamped workpiece is moved up to the first grinding wheels, while the actual face grinding operation is performed with conventional methods, by first grinding wheels supported on a grinding spindle. It is conceivable to mount the first grinding wheels in a stationary manner, and to perform the grinding operation by displacing the clamped workpiece in the direction of the X-axis. During the grinding operation, the two first grinding wheels surround the bar-shaped workpiece, the longitudinal direction of which runs parallel to the common rotational axis of the first grinding wheels, in this process. Here, the method can also be performed so that the workpiece remains in a stationary position, while the grinding wheel is displaceable in the longitudinal and transversal directions in relation to the workpiece.

A further refinement describes a first advantageous possibility, wherein the first partial operation for the face grinding process can transition into the second partial operation for the peripheral grinding process. To this end, according to the solution selected, the first grinding wheel on one side and at least one second grinding wheel on the other side are supported on a common grinding spindle head, which can be pivoted. By pivoting the grinding spindle head, either the first grinding wheel or the second grinding wheel can be moved into the grinding position for the bar-shaped workpiece. In terms of the feed movement in the direction of the X-axis, which is required during grinding, the common grinding spindle head will primarily be displaced in the direction of the X-axis in a controlled manner.

Another advantageous solution for the transition from the first to the second partial operation is provided according to another embodiment. To this end, the first grinding wheels for face grinding the faces, and the second grinding wheel for peripheral grinding of the longitudinal sides, are disposed on a common rotational axis and are always driven together. However, for each partial operation a different rotational speed may be selected, which has been optimized for the partial operation. The transition from the first clamping position to the second clamping position necessitates a displacement of the bar-shaped workpiece, which is likewise parallel to the common rotational axis of the grinding wheels, which is to say the direction of the C-axis. In the first clamping position, the displacement may be performed by the clamping device in question, which must therefore be displaceable in the direction of the X-axis and in the direction of the C-axis. Displacement can, however, also be performed by displacement of the clamping jaws, or of the workpiece spindle heads required for mounting the same.

Yet a further advantageous possibility for clamping the bar-shaped workpiece in the first clamping position, in a self-centering manner, in a clamping station is described, so that, during grinding, the longitudinal center of the workpiece remains independent from the grinding allowance of the blank. According to a still further embodiment, the clamping station must be displaceable in a controlled manner in the directions of the X-axis and C-axis so as to be able to perform the multiple tasks of conveying, stopping during face grinding, and transferring to the second clamping position, independently, which is to say without moving the workpiece spindle heads and clamping jaws.

In a further advantageous embodiment, the balanced loading grippers of the clamping station also serve as measuring sensors for determining the grinding allowance, which is crucial for the peripheral grinding process.

The invention further relates to the grinding machine that makes it possible to perform the method according to the invention. A first inventive solution provides that the transition from the face grinding of the faces to the longitudinal grinding of the longitudinal sides is effected by a displaceable and pivotable grinding spindle head. This configuration of the grinding machine corresponds to the method described above in which the first partial operation for the face grinding process can transition into the second partial operation for the peripheral grinding process.

Another solution for the grinding machine configured according to the invention is configured according to the method described above in which the first grinding wheels for face grinding the faces, and the second grinding wheel for peripheral grinding of the longitudinal sides, are disposed on a common rotational axis and are always driven together. The different grinding wheels for the face and peripheral grinding processes are provided as a grinding wheel set on the common rotational axis of a grinding spindle, which can be displaced in the direction of the X-axis in a controlled manner. The clamping station serves to receive the bar-shaped workpiece in the manner described and consecutively feed it to the different grinding wheels, and must also perform the transition from the first to the second clamping station.

The two grinding machines according to the foregoing approaches offer the advantage that a single bar-shaped workpiece passes through the machine at any given time, is face-ground on the faces in the first clamping position, and machined on the longitudinal sides by peripheral grinding in the second clamping position. After passing through the grinding machine, the grinding of the bar-shaped workpiece is finished. No parts need to be joined, thus reducing space requirements. As a result, the prerequisites for optimal continuous flow production are met. The required handling times are minimal.

The grinding machines according to the invention operate with proven basic elements of modern grinding technology, however these are linked in a novel manner by an intelligent conveying and clamping system. The design of the grinding machines remains simple. The grinding machines can be loaded by way of a loading cell through a loading hatch on the right or left, allowing for a so-called "keyhole solution" according to which the workpieces are fed from the side and the machine is operated solely from the front, which is to say from the side of the slideway.

The grinding machines according to the invention can also be used to economically produce smaller lot sizes because they are equipped to perform a complete machining operation on a defined workpiece type. Thus, the flexibility with respect to quantity is high. High model variety is also ensured, particularly with numerically controlled peripheral grinding based on CX interpolation principles. The setup times during changeover to a different cross-sectional shape for the bar-shaped workpieces can be very short. For example, with a bar-shaped workpiece having a square cross-section, it is possible to changeover from chamfered longitudinal edges to rounded longitudinal edges in minutes or less, because the changeover is performed solely by way of the parts program for the workpiece to be produced. The chamfer is adjusted together with the cross-section.

The above mentioned grinding machines are directed at adjusting the second grinding wheel of the grinding machine according to the invention to the longitudinal contour of the finished bar-shaped workpiece and can also encompass the chamfers on the face. Machining of the workpiece faces by the numerically controlled peripheral grinding method based on CX interpolation principles makes it possible to grind the rounded radii or chamfers on the edges together with the lateral surfaces, without extending the cycle time. This also applies to chamfers on the face if the contour of the grinding wheel is appropriately chamfered. The chamfers on the face are ground as part of the same clamping, in one contour operation, at the same time as the lateral surfaces and the longitudinally extending chamfers. Rechucking can be dispensed with. In the overall, the process can be controlled with considerably greater ease and reliability, with respect to the required geometric data (dimensional, shape and position tolerances). This not only saves machining time, but in particular also avoids the risk inaccuracy associated with rechucking. In addition, during trimming, the contour of the grinding wheels can be adjusted with accuracies in the mm range. This produces chamfers on the faces that always have precisely the same widths, across the entire lengths thereof, and relative on one and other. Also in this respect, the invention improves the machining speed and the accuracy of the results.

Further advantageous refinements of the grinding machines according to the invention are provided and explained in more detail in the embodiment which follows.

A further embodiment relates to a grinding cell, which is provided with a twin arrangement of two grinding machines according to the invention and a common loading cell. This further reduces the investment costs and space requirements, while maintaining the advantage of feeding only from the front.

The invention will be described in further detail hereafter based on the examples illustrated in the figures. The figures show the following:

BRIEF DESCRIPTION OF THE DRAWINGS

FIG. 2 shows different longitudinal contours, which the bar-shaped workpiece to be ground may have;

DETAILED DESCRIPTION OF THE INVENTION

Figure 1:
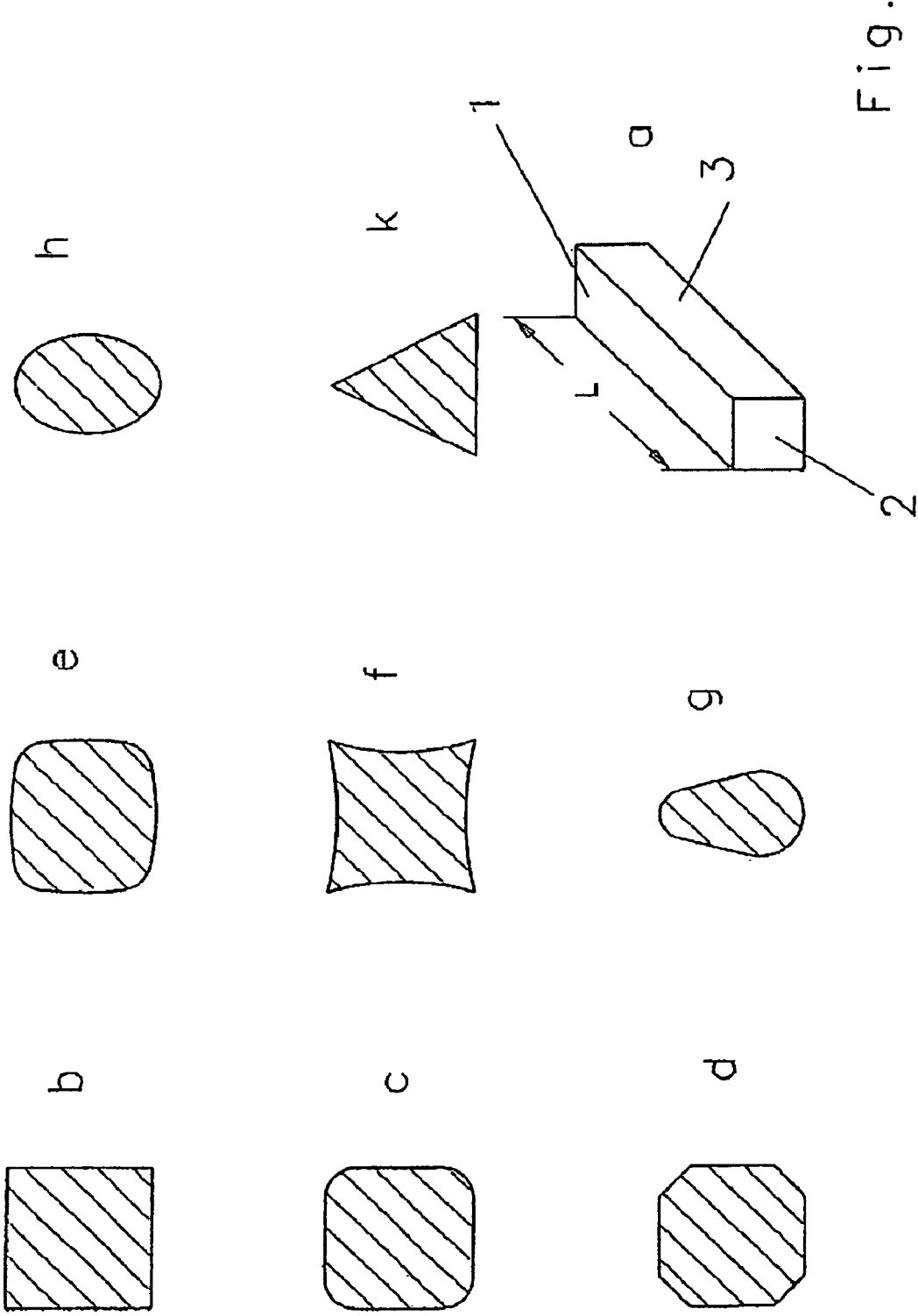
FIG. 1 illustrates various non-circular cross-sections of bar-shaped workpieces, which are to be ground according to the invention.

FIG. 1 illustrates, by way of example, shapes which the cross-sections of the bar-shaped workpiece 1 to be ground can have. In the simplest form, the bar-shaped workpiece 1 is a small cuboid rod having cuboid faces 2 and rectangular longitudinal sides 3, see FIG. 1a. A preferred field of application for such bar-shaped workpieces 1 is that of actuators in mechanical switching or adjusting devices. These actuators can have a length L between 20 and 80 mm and a cross-section between 4 and 15 mm. However, this is only an example. Various metals, as well as ceramics, are possible as materials for such bar-shaped workpieces 1. Depending on the desired function, the cross-section (as illustrated by examples in FIG. 1) may also deviate from the shape of a strict geometrical square (FIG. 1b). For example, the longitudinal edges can be rounded (FIG. 1c) or provided with flat chamfers (FIG. 1d). The square shape can also be varied to form a square having convex surfaces (FIG. 1e) or concave surfaces (FIG. 1f). Furthermore, contours having cross-sections solely delimited by curved lines (FIG. 1g), including oval contours (FIG. 1h) or polygons of any kind (FIG. 1k) are possible, and the variations described for the square cross-section are also applicable thereto.

The longitudinal contour of the bar-shaped workpiece 1 to be ground is likewise in no way confined to the strict geometrical rectangle shape, as is shown in FIG. 2a.

FIG. 2 shows the longitudinal sides 3 of the bar-shaped workpiece 1 in different variants. For example, flat chamfers 2a (FIG. 2b) or rounded edges 2b (FIG. 2c) may be present at the transition to the faces 2. The strict rectangular shape can be varied to form a convex shape (FIG. 2d). Furthermore, conical longitudinal contours (FIG. 2e) are possible, as is a basic rectangular shape having a lowered center part (FIG. 2f).

Figure 3:
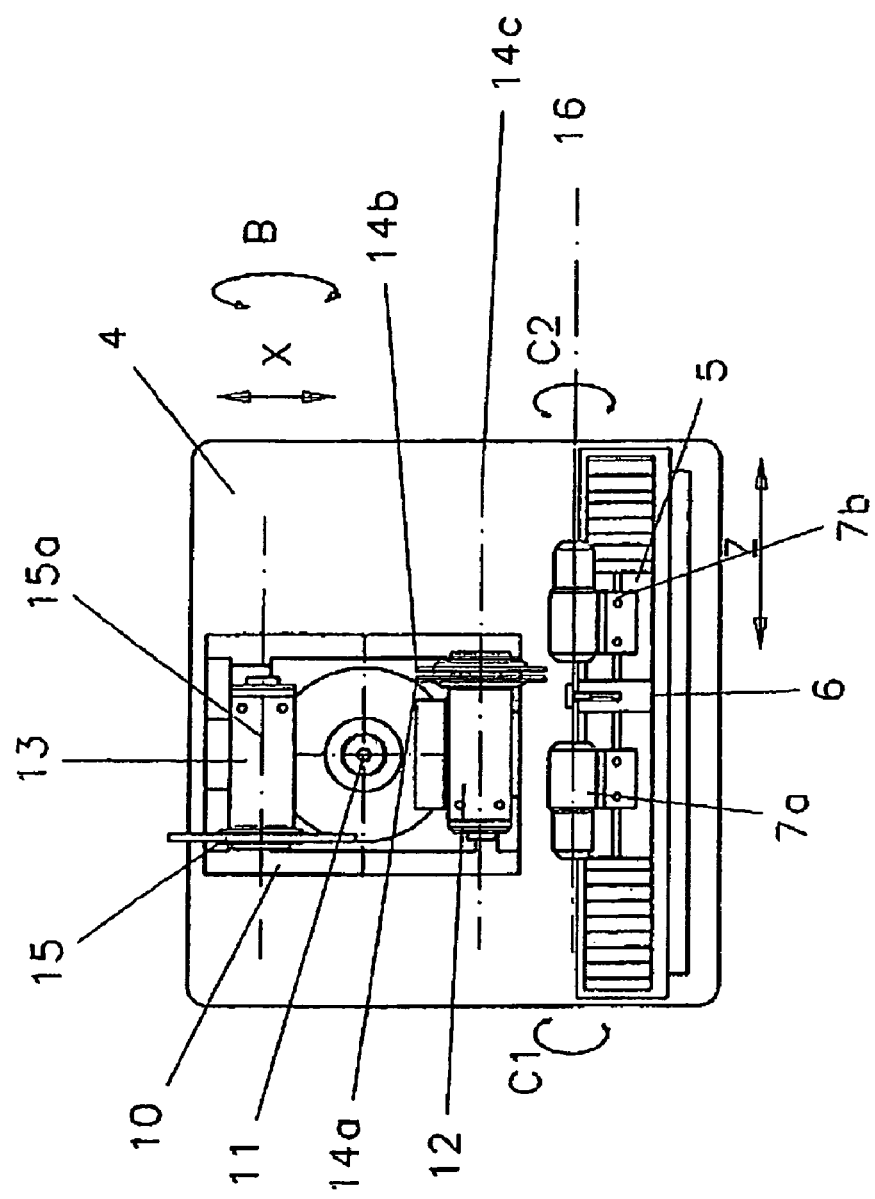
FIG. 3 is a view from above of a first embodiment of a grinding machine for performing the method according to the invention.

FIG. 3 shows the first embodiment of a grinding machine, which allows complete machining of the bar-shaped workpiece 1 starting with a blank having a cuboid shape. On a machine base 4, a grinding table having a slideway 5 is provided, on which a clamping station 6 can be displaced in the direction of this slideway 5 and perpendicular thereto. On both sides of the clamping station 6, the workpiece spindle heads 7a and 7b are provided, which are likewise displaceable on the slideway. The workpiece spindle heads 7a, 7b may be displaceable individually or collectively. Clamping jaws 8a, 8b, which can be driven in rotation, are supported in the workpiece spindle heads 7a, 7b. A controller is provided, which rotates the two clamping jaws 8a, 8b, which are coaxially disposed at a distance from each other, in a strictly synchronous and in-phase manner.

At the outer ends, the clamping jaws 8a, 8b bear a friction lining 9a, 9b, by which the clamping jaws 8a, 8b can be pressed against the faces 2 of the bar-shaped workpiece 1 so as to clamp it, as shown, for example, also in FIG. 6b. The friction linings 9a, 9b of the clamping jaws 8a, 8b are made of a highly wear-resistant material, for example hard metal, in order to reduce wear.

A grinding spindle head 10 can be displaced exactly perpendicular to the grinding table comprising the slideway 5, and to the lateral displacement direction of the workpiece spindle heads 7a, 7b and/or the clamping jaws 8a, 8b thereof. The grinding spindle head 10 can furthermore be pivoted about a vertical axis 11. The grinding spindle head 10 bears two grinding spindles 12 and 13. The first grinding spindle 12 bears two first grinding wheels 14a, 14b, while the second grinding spindle 13 is provided with the second grinding wheel 15. The grinding spindles 12 and 13 drive the associated grinding wheels 14a, b and 15 in rotation about the rotational axes 14c and 15a thereof. By pivoting the grinding spindle head by 180°, optionally the first grinding wheels 14a, 14b or the second grinding wheel 15 can be moved to the working positions thereof.

According to conventional grinding technology designations, the slideway 5, in conjunction with the lateral displacement direction of the clamping station 6 and the workpiece spindle heads 7a, 7b, defines the Z-axis. The common rotational and drive axis 16 of the clamping jaws 8a, 8b forms the rotational axis C, while the displacement direction of the grinding spindle head 10, which extends perpendicular to the Z-axis and C-axis, is the X-axis.

Figure 4:
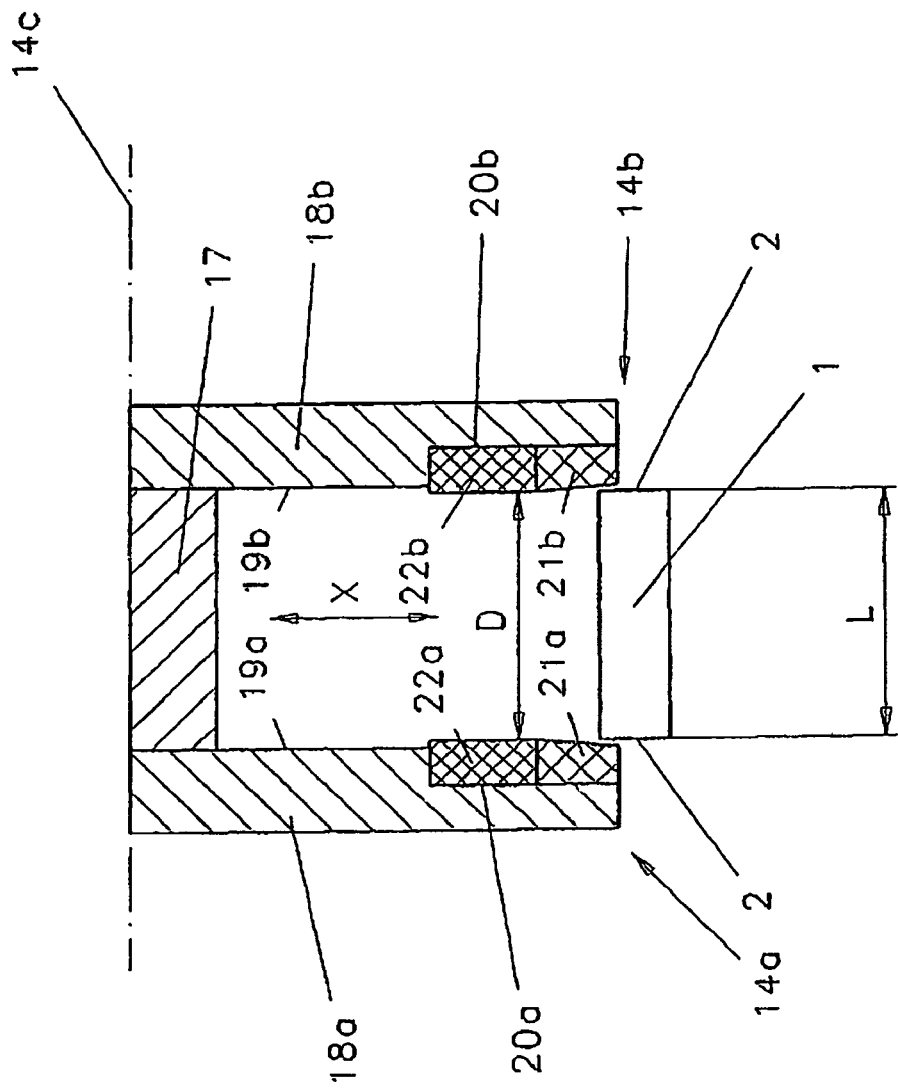
FIG. 4 illustrates the double-disk face grinding process, which is part of the method according to the invention.

The details of the first grinding wheels 14a, 14b provided in the twin arrangement are apparent from FIG. 4. The two first grinding wheels 14a, 14b are disposed on the common rotational axis 14c of the first grinding spindle 12 at an axial distance D, which is defined by the spacer disc 17. Each grinding wheel 14a, 14b is constituted by a base body 18a, 18b. The outer circumferential regions of the two lateral sides 19a, 19b of the base bodies 18a, 18b, which are the sides facing each other, each have a recess 20a, 20b, in which an outer annular zone 21a, 21b comprising a rough grinding coating and an inner annular zone 22a, 22b comprising a finishing coating are provided. The two coatings 21a, 21b and 22a, 22b form annular bodies inside the recesses 20a, 20b. To this end, the outer annular zones 21a, 21b, which have the rough grinding coating, form an outwardly conically tapering shape.

Figure 5:
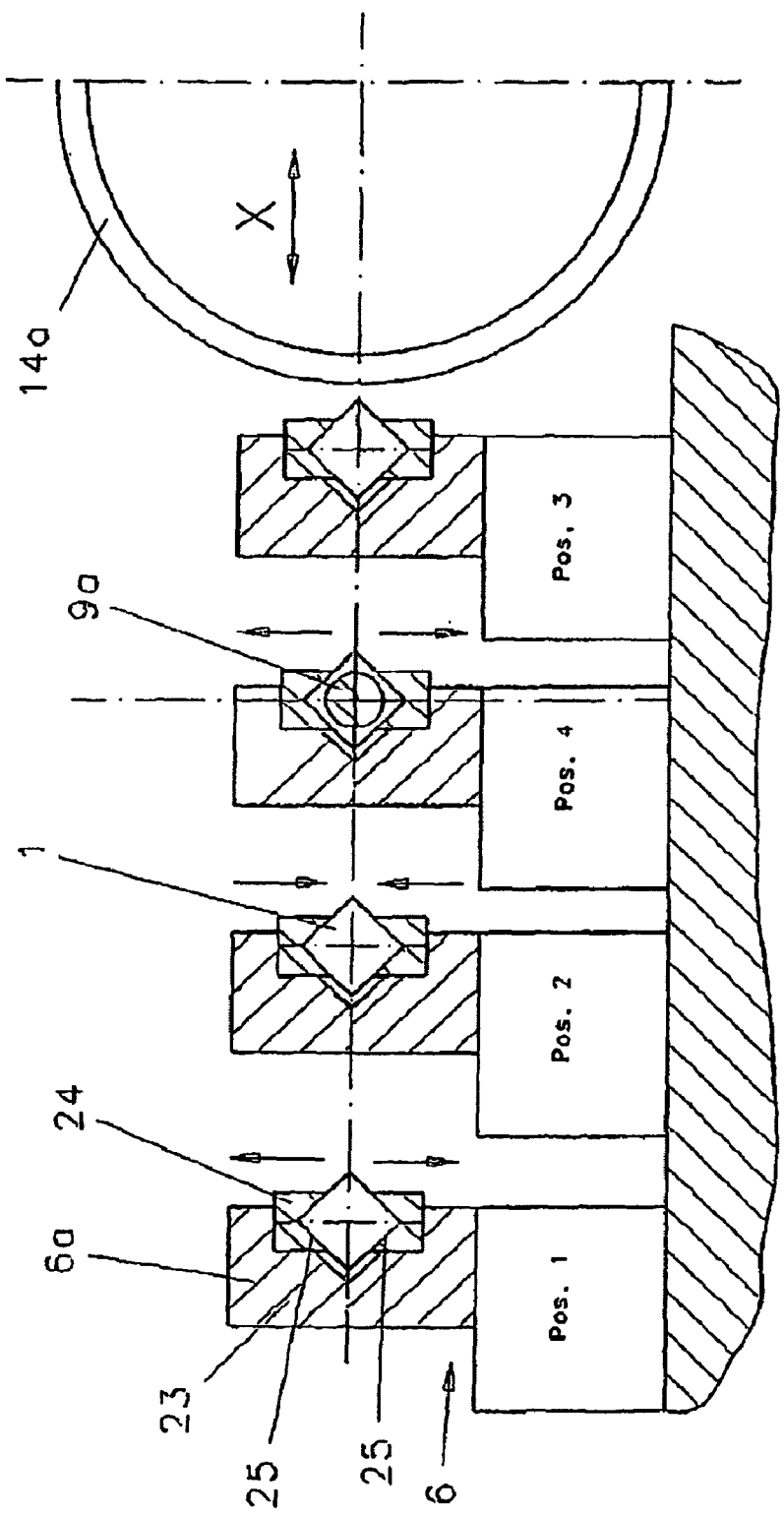
FIG. 5 is a representative illustration of some of the motion sequences undergone by the bar-shaped workpiece during grinding.

FIG. 5 shows that the clamping station 6 mentioned above can be displaced not only in the direction of the Z-axis or C-axis, but also in the direction of the X-axis. In the base part 6a, two loading grippers 24 are diametrically disposed and controlled so as to move in opposite directions from each other. The loading grippers 24 are adjusted, with the gripping surfaces 24a thereof, to the cross-section of the bar-shaped workpiece 1. In position 1 of FIG. 5, the loading grippers 24 are moved apart. In position 2, the loading grippers 24 have seized the bar-shaped workpiece 1 and are positioned against it in a balanced manner. This type of mount has the advantage that, during gripping and clamping of the bar-shaped workpiece 1, the longitudinal center thereof always remains in the same horizontal plane, even if the grinding dimensions of the workpieces 1 vary. Thus, as differs from a rigid workpiece support, the grinding allowance 31 (see FIG. 6a) has no influence on the position of the workpiece center. During subsequent peripheral grinding, the allowance is uniformly removed. As position 3 according to FIG. 5 shows, the clamping station 6 can move the clamped bar-shaped workpiece 1 up close to the first grinding wheels 14a, 14b.

The procedure for a grinding operation on a grinding machine according to FIG. 3 will be described in detail hereafter.

The blank for the bar-shaped workpiece 1 is transferred to the clamping station 6 by a conventional conveying system. There, as described above, it is clamped in a self-centering manner by means of the loading grippers 24, see position 2 of FIG. 5. The clamping station 6 then moves into position 3 up to the operating range of the first grinding wheels 14a, 14b. In this first clamping position, which can be seen in FIG. 5, the two faces 2 of the bar-shaped workpiece 1 are ground simultaneously by double-disk face grinding. To this end, the grinding spindle head 10 is displaced forward in the direction of the X-axis against the bar-shaped workpiece 1, see FIG. 4. The outer annular zones 21a, 21b having the rough grinding coating each perform a rough grinding operation on one face 2 of the bar-shaped workpiece 1. Then, the inner annular zones 22a, 22b having the finishing coating each pass over a face 2, thereby finishing the faces 2.

The grinding spindle head 10 then returns to the starting position in the direction of the X-axis, while the clamping station 6 assumes position 4 according to FIG. 5. The bar-shaped workpiece 1 is then located in the range of the common rotational and drive axis 16 of the two clamping jaws 8a, 8b.

The two workpiece spindle heads 7a, 7b then approach the bar-shaped workpiece 1 on both sides until the clamping jaws 8a, 8b with the friction linings 9a, 9b have clamped the bar-shaped workpiece 1 at the faces 2. Depending on the design of the workpiece spindle heads 7a, 7b, clamping of the bar-shaped workpiece 1 at the faces 2 can also be brought about solely by the clamping jaws 8a, 8b, if these can not only be driven rotationally, but are also axially displaceable. Thereafter, the loading grippers 24 of the clamping station 6 are moved apart, and the clamping station 6 can return to the starting position, which corresponds to position 1 in FIG. 5, in order to receive a new workpiece blank.

The advantage of this type of rechucking is that it eliminates the need for the workpiece to be seized separately in a loading handling step. As a result, optimized accuracy can be achieved for the clamping between the clamping jaws 8a, 8b, and positioning errors due to loading handling can be eliminated.

The grinding spindle head 10 has meanwhile been pivoted about the vertical axis 11 thereof, so that the second grinding spindle 13 with the second grinding wheel 15 is in the grinding position, which is to say it is located in the range of the bar-shaped workpiece 1.

Figure 6:
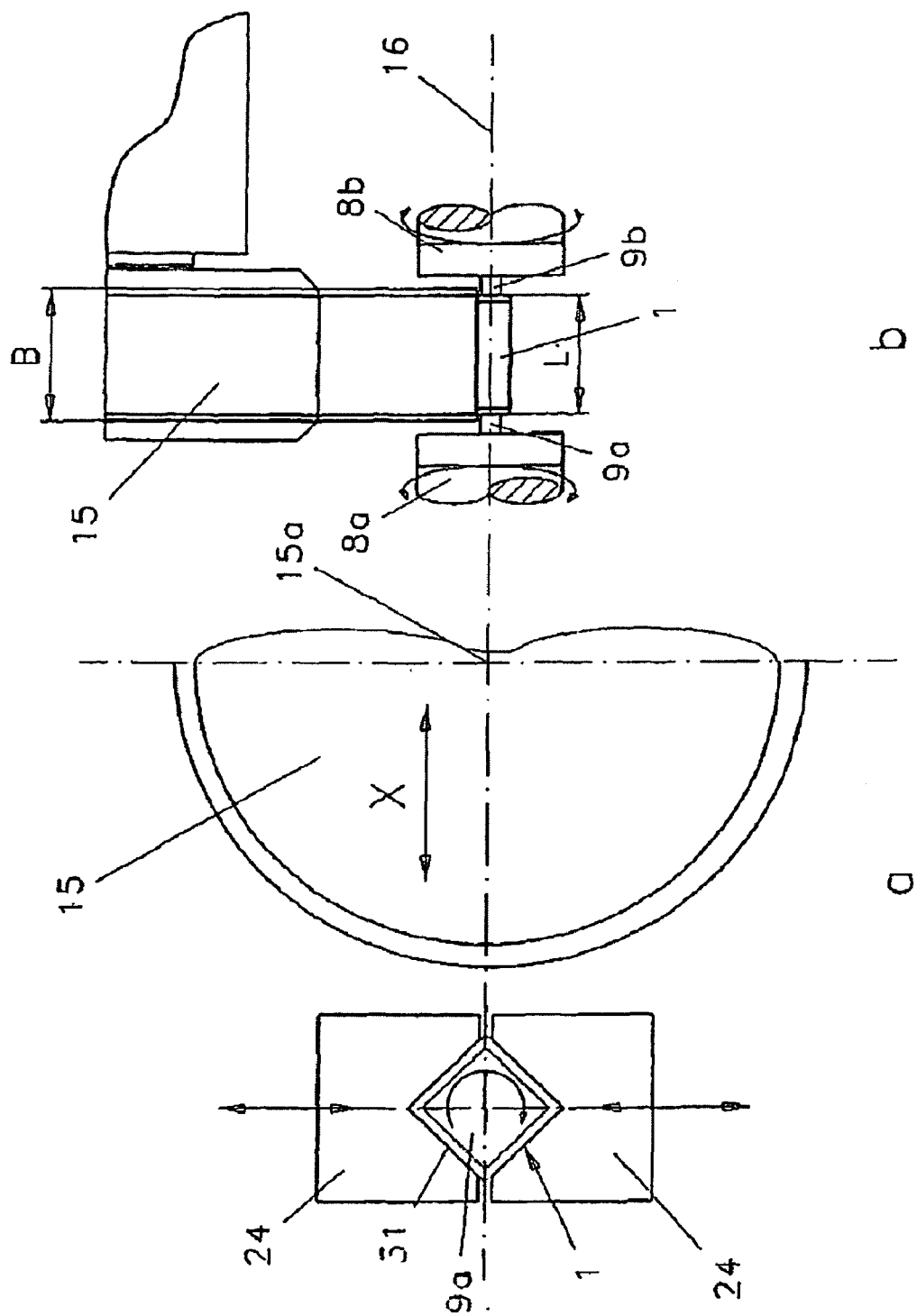
FIG. 6 describes the principles of CX interpolation during peripheral grinding of the bar-shaped workpiece.

The bar-shaped workpiece 1 is not only clamped in the second clamping position by the two clamping jaws 8a, 8b, but is also driven in rotation in a controlled manner by the two clamping jaws 8a, 8b, wherein the common rotational and drive axis 16 of the two clamping jaws 8a, 8b forms the C-axis for the grinding operation. This step of controlled peripheral grinding can be seen in FIG. 6. FIG. 6a shows the grinding operation from the side. For better clarity, the bar-shaped workpiece 1 is shown at the moment in which the two clamping positions are active. The two loading grippers 24 still rest against the longitudinal sides of the bar-shaped workpiece 1, while at the same time the two clamping jaws also seize the bar-shaped workpiece 1 at the faces thereof by means of the friction linings. In FIG. 6a, the friction lining 9a is shown. FIG. 6a thus shows that the clamping by means of the loading gripper 24 is performed in a centered manner, so that the grinding allowance 31 has no influence on the position of the workpiece center. Of course, the clamping jaws 8a, 8b can only rotate the bar-shaped workpiece 1 if it is located outside of the loading grippers 24, and the first clamping position has been released. In addition, FIG. 6a shows how the second grinding wheel 15 is moved and advanced toward the periphery of the bar-shaped workpiece 1 in the direction of the X-axis.

FIG. 6b shows the state of the peripheral grinding operation in the second clamping position from above, wherein the clamping jaws 8a, 8b chuck and at the same time turn the bar-shaped workpiece 1. The common rotational and drive axis 16 forms the C-axis for the grinding operation. The axial width B of the second grinding wheel 15 extends across the length L of the bar-shaped workpiece 1.

A peripheral grinding step based on CX interpolation principles is performed, wherein each rotational position of the bar-shaped workpiece 1 corresponds to a defined distance between the C-axis and the rotational axis 15a of the second grinding wheel in the direction of the X-axis. Those skilled in the art are familiar with this step from the known CNC non-circular grinding method and require no further explanation here. It is apparent that, based on this principle, the cross-sections shown in FIG. 1 and similar cross-sections can be achieved. The mutual displacement of the workpiece 1 and second grinding wheel 15 is brought about by the displacement of the grinding spindle head 10 in the direction of the X-axis. The rough grinding and finishing steps can be performed by a single second grinding wheel 15. It is also possible, however, to dispose two grinding wheels on the second grinding spindle 13, of which one serves rough grinding purposes while the other serves finishing purposes.

The different longitudinal contours shown in FIG. 2 can be implemented by appropriate profiles of the circumferential contour 15a of the second grinding wheel 15, see FIG. 2d. In particular, chamfers 2a or rounded edges 2b on the faces can also be ground on the bar-shaped workpiece 1 in one contour operation, in the same clamping, at the same time as the longitudinal sides 3 are ground. The circumferential contour 15a of the second grinding wheel 15 must be shaped accordingly, see FIG. 2b.

It is apparent that the clamping station 6 performs alternating tasks in the course of the method according to the invention. First, it serves as a transport device, which moves the bar-shaped workpiece 1 into the operating range of the first grinding wheels 14a, 14b. There, it also serves as a clamping device, which ensures the first clamping position of the bar-shaped workpiece 1 during grinding of the faces. Thereafter, the clamping station 6 again serves as a conveying means, which transfers the bar-shaped workpiece 1 into the range of the two clamping jaws 8a, 8b according to position 4 in FIG. 5. The clamping jaws 8a, 8b are clamped in the second clamping position in order to perform the peripheral grinding operation. The clamping station 6 has then fulfilled its task on the first bar-shaped workpiece 1 and returns to position 1 in order to receive the next workpiece blank.

The peripheral grinding process described here has a particular advantage if the bar-shaped workpiece 1 has a layered design in the transverse direction, which is valuable for some applications, such as for piezo actuators. Thus, layers made of different materials can be provided alternately. As differs from longitudinal face grinding, during peripheral grinding the materials of the individual layers do not bleed into each other in the region of the lateral surfaces.

Figure 7:
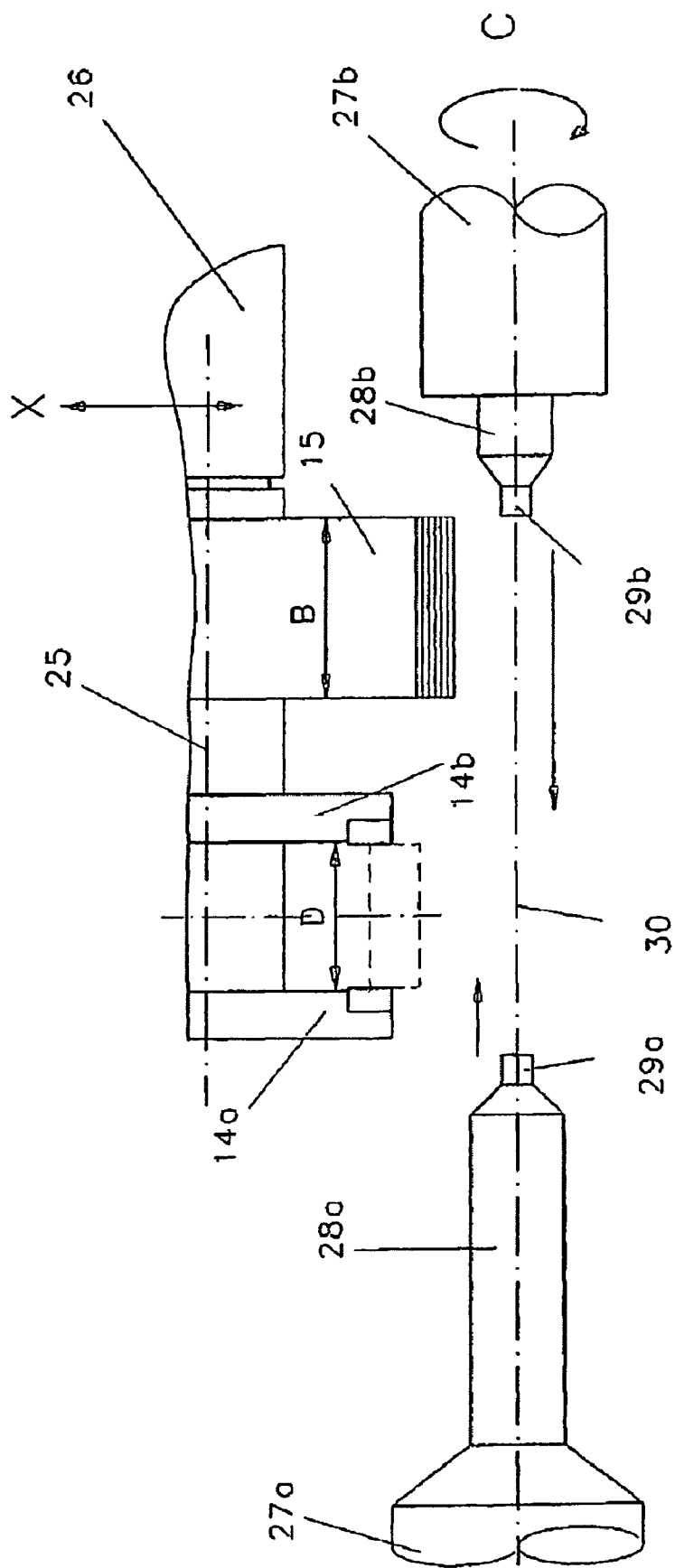
FIG. 7 shows a view from above, corresponding to FIG. 3, of a second embodiment of a grinding machine according to the invention.

With the variant of a grinding machine according to the invention shown in FIG. 7, instead of a grinding spindle head comprising two grinding spindles, a single grinding wheel set is provided, which comprises the first grinding wheels 14a, 14b and the second grinding wheel 15 on a common rotational axis 25. This grinding wheel set is provided on a common grinding spindle 26. The workpiece spindle heads are designed with numerals 27a, 27b in FIG. 7, the clamping jaws with 28a, 28b and the friction linings on the clamping jaws with 29a, 29b. The double-disk face grinding procedure in the first clamping position of the bar-shaped workpiece 1 remains unchanged with respect to the first example. In order to transfer the workpiece 1 to the second clamping position, mutual axial displacement of the common grinding spindle 26 and of the grinding spindle heads 27a, 27b is required. However, it may also suffice to configure the clamping jaws 28a, 28b, which are movable inside the workpiece spindle heads 27a, 27b, so as to be axially displaceable.

The peripheral grinding process in the second clamping position then occurs in the same manner as has been described for the first embodiment.

Figure 8:
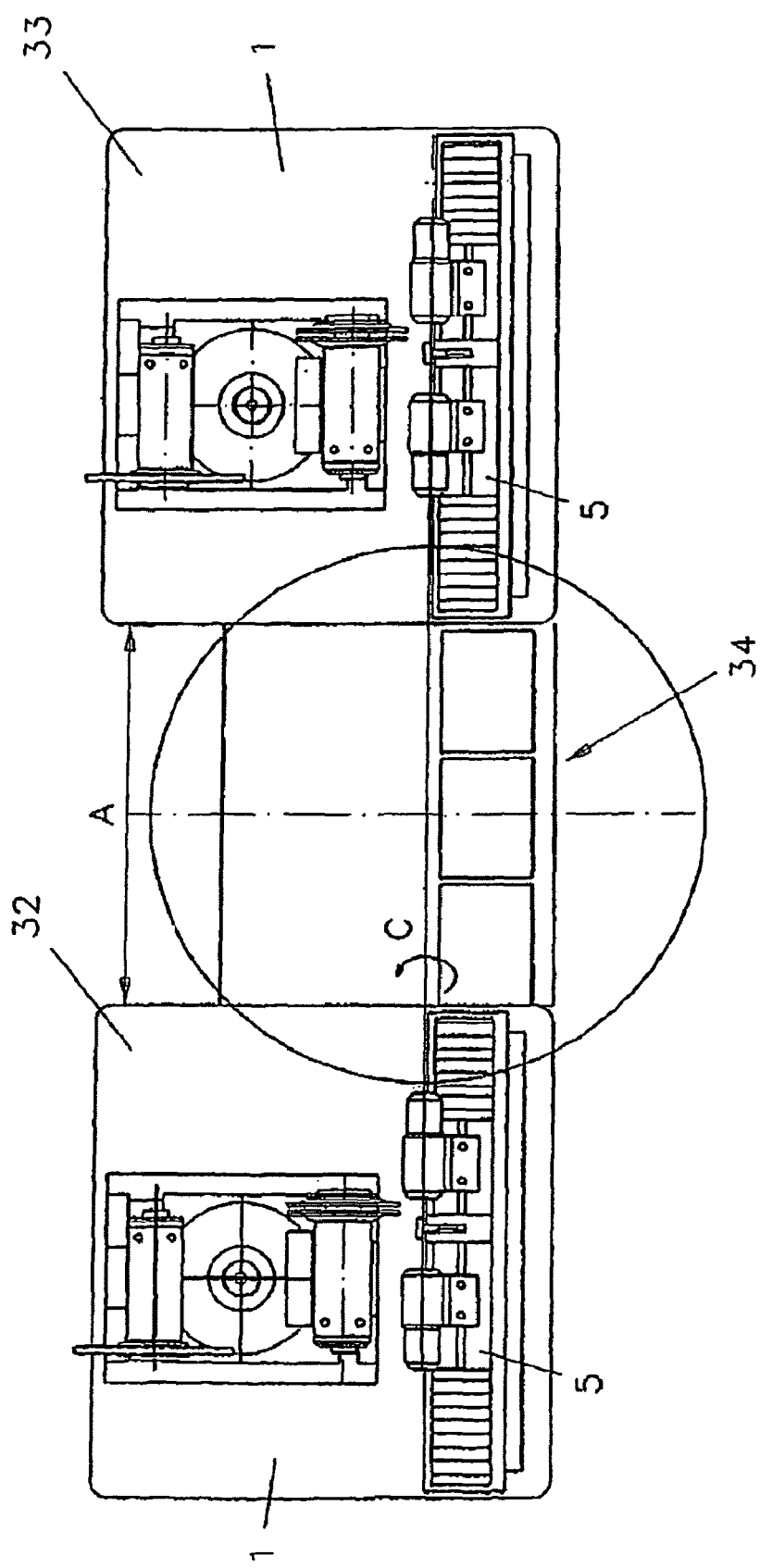
FIG. 8 shows an embodiment in which two grinding machines according to the invention are combined into one grinding cell in a twin arrangement.

FIG. 8 shows the assembly of two grinding machines 32, 33 according to the invention to form a grinding cell. The two grinding machines 32, 33 are set up next to each other in a twin arrangement, while maintaining a distance A, so that the direction of the grinding tables is the same as that of the slideways 5 and the C-axes. Between the two grinding machines 32, 33, a common loading cell 34 is accommodated, which supplies both grinding machines with the blanks for the bar-shaped workpiece 1. This further reduces investment costs and space requirements, while maintaining the advantage of feeding only from the front.

REFERENCE NUMERALS

1 Bar-shaped workpiece
2 Face
2a Chamfer on face
2b Rounded edge on face
3 Longitudinal side
4 Machine base
5 Slideway
6 Clamping station
6a Base part
7a, b Workpiece spindle head
8a, b Clamping jaws
9a, b Friction lining
10 Grinding spindle head
11 Vertical axis
12 First grinding spindle
13 Second grinding spindle
14a, b First grinding wheels
14c Rotational axis of the first grinding wheels
15 Second grinding wheel
15a Rotational axis of the second grinding wheel
15b Circumferential contour of the second grinding wheel
16 Common rotational and drive axis
17 Spacer disc
18a, b Base body
19a, b Lateral side
20a, b Recess
21a, b Outer annular zone
22a, b Inner annular zone
23 Base part of the clamping station 6
24 Loading gripper
24a Gripping surface
25 Common rotational axis
26 Common grinding spindle
27a, b Workpiece spindle head
28a, b Clamping jaws
29a, b Friction lining 30 Common rotational and drive axis
31 Grinding allowance
32 Grinding machine
33 Grinding machine
34 Common loading cell
A Distance between two grinding machines
B Axial width of the second grinding wheel
C Rotational axis of the bar-shaped workpiece during peripheral grinding
D Distance of the first grinding wheels from each other
L Length of the bar-shaped workpiece
X Axial direction of the feed motion perpendicular to the longitudinal axis of the bar-shaped workpiece

The invention claimed is:

1. A method of grinding a bar-shaped workpiece which has a non-circular cross-section formed by flat and/or curved lines and flat faces which are parallel to each other, the method comprising:
   clamping the bar-shaped workpiece on longitudinal sides thereof in a first clamping position;
   simultaneously finishing two end faces of the bar-shaped workpiece by employing double-disk face grinding;
   transferring the clamped bar-shaped workpiece between two clamping jaws coaxially disposed at a distance from each other and clamping at the end faces thereof by the clamping jaws in a second clamping position;
   releasing the first clamping position on the longitudinal sides;
   rotating the clamping jaws in a synchronously controlled manner;
   rough grinding the longitudinal sides of the bar-shaped workpiece and finishing by employing CNC-controlled peripheral grinding based on CX interpolation principles, wherein the C-axis is formed by a common rotational and drive axis of the two clamping jaws and the X-axis extends perpendicular to the C-axis;
   moving apart the clamping jaws in order to release the second clamping position; and
   transferring the bar-shaped workpiece to an unloading device.

2. The Method according to claim 1, wherein:
   the double-disk face grinding of the faces includes feeding the bar-shaped workpiece in the first clamping position to two rotating first grinding wheels coaxially disposed at an axial distance D from each other, wherein the longitudinal direction of the bar-shaped workpiece extends parallel to a common rotational axis of the first grinding wheels;
   the double-disk face grinding operation is performed by the mutual displacement of the bar-shaped workpiece and the first grinding wheels in the direction of the X-axis; and
   during the mutual displacement, the two faces of the bar-shaped workpiece consecutively pass through outer annular zones having a rough grinding coating disposed on mutually facing lateral sides of the first grinding wheels, and thereafter through inner annular zones having a finishing coating.

3. The method according to claim 2, wherein:
   the longitudinal sides of the bar-shaped workpiece in the second clamping position are ground by at least one rotating second grinding wheel, a rotational axis of which extends parallel to the common rotational and drive axis of the two clamping jaws; and
   the first and second grinding wheels are brought into the grinding positions thereof and are removed therefrom again by use of a pivoting common grinding spindle head on which the first and second grinding wheels are disposed with the rotational axes extending parallel to each other.

4. The method according to claim 2, wherein the longitudinal sides of the bar-shaped workpiece are ground while in the second clamping position by rotating at least one second grinding wheel which shares a common rotational axis with the first grinding wheels, the bar-shaped workpiece being transferred from the grinding position thereof on the first grinding wheels to the grinding position on the second grinding wheel by a transfer process comprising:
   guiding the bar-shaped workpiece situated in the first clamping position thereof outward in the direction of the X-axis out of the range of the first grinding wheels;
   changing the workpiece from the first clamping position to the second clamping position; and
   displacing the bar-shaped workpiece in the second position, and the first and second grinding wheels located on the common rotational axis, parallel relative to each other, until the bar-shaped workpiece is located in the operating range of the second grinding wheel.

5. A method according to claim 1, wherein:
   the bar-shaped workpiece in the first clamping position is seized by at least two loading grippers provided on a displaceable clamping station; and
   the grippers are adjusted to the cross-section of the bar-shaped workpiece and rest against the longitudinal sides of the bar-shaped workpiece in a balanced manner opposite from each other.

6. The method according to claim 5, wherein the clamping station is displaceable in a controlled manner in the directions of the X-axis and the C-axis.

7. The method according to claim 5, wherein the balanced loading grippers also serve to determine a grinding allowance for the peripheral grinding process in the second clamping position.

8. A grinding machine for grinding bar-shaped workpieces which have a non-circular cross-section formed by flat and/or curved lines and flat faces which are parallel to each other, comprising:
   a machine base;
   a slideway formed on said machine base;
   two workpiece spindle heads being disposed on said slideway in an individually or collectively displaceable and fixable manner,
   clamping jaws being supported by the workpiece spindle heads, said clamping jaws including clamping surfaces which face each other, each of the two workpiece spindle heads comprising an electromotive rotary drive for a respective one of the clamping jaws provided on each of the spindle heads, wherein rotational and drive axes for both clamping jaws are geometrically identical and form the C-axis for a grinding operation;
   a controller operable for placing the two clamping jaws in synchronous, in-phase rotational motion, and for clamping the bar-shaped workpiece between the clamping jaws by moving the clamping jaws together against the faces of the workpiece;
   a grinding spindle head being disposed on the machine base, said grinding spindle head being displaceable in a direction perpendicular to the C-axis in a controlled manner, the direction of displacement thereof defining the X-axis of a grinding operation;
   a first and a second grinding spindle being borne on the grinding spindle head, which are movable into grinding positions thereof by pivoting of the grinding spindle head about the vertical axis;

two first grinding wheels being supported with a common rotational axis on the first grinding spindle, a distance D of the wheels from each other corresponding to a length L of the bar-shaped workpiece;

at least one second grinding wheel being provided on the second grinding spindle, an axial width B of the at least one second grinding wheel extending over the length L of the bar-shaped workpiece;

a clamping station being provided on the slideway between the workpiece spindle heads, the clamping station being displaceable with a base part in a controlled manner in the direction of the X-axis and comprising self-centering loading grippers provided on the base part, the clamping station being configured to clamp the bar-shaped workpiece on the longitudinal sides thereof in a first clamping position and to displace the bar-shaped workpiece in a longitudinal direction extending parallel to the C-axis from a loading position into a grinding position for face grinding of exposed faces by lateral sides of the first grinding wheels, the lateral sides facing each other, and to displace the bar-shaped workpiece from there into a transfer position in the range of the clamping jaws, which receive the bar-shaped workpiece in a clamping manner in a second clamping position; and the controller being configured to perform a CNC-controlled peripheral grinding step based on CX interpolation principles, if the second grinding wheel, the rotational axis of which extends parallel to the C-axis, is in the grinding position.

9. The grinding machine according to claim 8, wherein a circumferential contour of the second grinding wheel covering the length L of the bar-shaped workpiece is configured in a manner that deviates from a cylindrical shape and corresponds to the longitudinal contour of the finished bar-shaped workpiece.

10. The grinding machine according to claim 9, wherein the circumferential contour of the second grinding wheel is further shaped to correspond to a shape of a chamfer on a face of the bar-shaped workpiece, or a rounded edge on the face, which is intended to be incorporated by grinding on the bar-shaped workpiece.

11. A grinding machine according to claim 8, wherein a friction lining is carried on each of the clamping jaws for contact with the faces of the bar-shaped workpiece.

12. A grinding machine according to claim 8, wherein the two mutually facing lateral sides of the first grinding wheels in an outer circumferential region thereof each include an outer annular zone having a rough grinding coating and an inner annular zone having a finishing coating, an axial distance between the two outer annular zones increasing toward an outside.

13. A grinding machine according to claim 8, further comprising at least two loading grippers being diametrically disposed on the base part of the clamping station, gripping surfaces of the at least two loading grippers being adjustable to the cross-section of the bar-shaped workpiece.

14. A grinding cell, comprising:

two of the grinding machines according to claim 8 which are disposed next to each other such that control sides thereof abut or face each other; and a common loading cell being disposed in a intermediate space between the two grinding machines.

15. A grinding machine for grinding bar-shaped workpieces which have a non-circular cross-section formed by flat and/or curved lines and flat faces which are parallel to each other, comprising:

a machine base;

a slideway formed on said machine base;

two workpiece spindle heads being disposed on said slideway in an individually or collectively displaceable and fixable manner, clamping jaws being supported by the workpiece spindle heads, said clamping jaws including clamping surfaces which face each other, each of the two workpiece spindle heads comprising an electromotive rotary drive for a respective one of the clamping jaws provided on each of the spindle heads, wherein rotational and drive axes for both clamping jaws are geometrically identical and form the C-axis for a grinding operation;

a controller operable for placing the two clamping jaws in synchronous, in-phase rotational motion, and for clamping the bar-shaped workpiece between the clamping jaws by moving the clamping jaws together against the faces of the workpiece;

a grinding spindle being disposed on the machine base comprising a grinding wheel set which is displaceable in a direction perpendicular to the C-axis, the displacement direction of the grinding spindle defining the X-axis of the grinding operations, the grinding wheel set comprising two first grinding wheels, an axial distance D from each other corresponding to a length L of the bar-shaped workpiece, and a second grinding wheel, the axial width B of which extends over the length L of the bar-shaped workpiece, all the first and second grinding wheels being supported on a common rotational axis;

a clamping station being provided on the slideway between the workpiece spindle heads, the clamping station being displaceable with a base part in a controlled manner in the direction of the X-axis and in the direction of the C-axis, and comprising self-centering loading grippers provided on the base part, the clamping station being configured to clamp the bar-shaped workpiece on the longitudinal sides thereof in a first clamping position and to displace the bar-shaped workpiece in a longitudinal direction extending parallel to the C-axis from a loading position into a grinding position for face grinding of exposed faces by lateral sides of the first grinding wheels, the lateral sides facing each other, and to displace the bar-shaped workpiece from there into a transfer position in the range of the clamping jaws, which receive the bar-shaped workpiece in a clamping manner in a second clamping position; and the controller being configured to perform a CNC-controlled peripheral grinding step based on CX interpolation principles, if the second grinding wheel, the rotational axis of which extends parallel to the C-axis, is in the grinding position.

16. The grinding machine according to claim 15, wherein a circumferential contour of the second grinding wheel covering the length L of the bar-shaped workpiece is configured in a manner that deviates from a cylindrical shape and corresponds to the longitudinal contour of the finished bar-shaped workpiece.

17. The grinding machine according to claim 16, wherein the circumferential contour of the second grinding wheel is further shaped to correspond to a shape of a chamfer on a face of the bar-shaped workpiece, or a rounded edge on the face, which is intended to be incorporated by grinding on the bar-shaped workpiece.

18. A grinding machine according to claim 15, wherein a friction lining is carried on each of the clamping jaws for contact with the faces of the bar-shaped workpiece.

19. A grinding machine according to claim 15, wherein the two mutually facing lateral sides of the first grinding wheels in an outer circumferential region thereof each include an outer annular zone having a rough grinding coating and an inner annular zone having a finishing coating, an axial distance between the two outer annular zones increasing toward an outside.

20. A grinding machine according to claim 15, further comprising at least two loading grippers being diametrically disposed on the base part of the clamping station, gripping surfaces of the at least two loading grippers being adjustable to the cross-section of the bar-shaped workpiece.

21. A grinding cell, comprising:
two of the grinding machines according to claim 15 which are disposed next to each other such that control sides thereof abut or face each other; and a common loading cell being disposed in a intermediate space between the two grinding machines.

* * * * *